United States Patent [19]

Hainke et al.

[11] Patent Number: 5,275,519
[45] Date of Patent: Jan. 4, 1994

[54] ANCHOR BOLT

[75] Inventors: Elisabeth Hainke, Glockengiesserweg 19, D-4800 Bielefeld 12; Hans U. Hainke, Bielefeld, both of Fed. Rep. of Germany

[73] Assignee: Elisabeth Hainke, Bielefeld, Fed. Rep. of Germany

[21] Appl. No.: 962,882

[22] Filed: Oct. 19, 1992

[30] Foreign Application Priority Data

Apr. 7, 1992 [DE] Fed. Rep. of Germany ....... 4211565

[51] Int. Cl.$^5$ .................. F16B 13/04; F16B 13/06
[52] U.S. Cl. ............................ 411/55; 411/34; 411/42; 411/45
[58] Field of Search .............. 411/34, 37, 38, 42, 411/54, 55, 60, 61, 501

[56] References Cited

U.S. PATENT DOCUMENTS

| 626,040 | 5/1899 | Rowlands | 411/54 |
| 2,958,070 | 10/1960 | Brewer et al. | 411/55 |
| 5,123,791 | 6/1992 | Rockenfeller et al. | 411/54 X |

FOREIGN PATENT DOCUMENTS 343992 3/1931 United Kingdom ............. 411/54

Primary Examiner—Neill R. Wilson
Attorney, Agent, or Firm—Herbert L. Lerner; Laurence A. Greenberg

[57] ABSTRACT

An anchor bolt for anchoring in a hole of an arbitrary component includes a tension bolt having a threaded portion and an adjoining frustoconical head portion. An expanding sleeve has a polygonal cross section, a female-threaded portion and an adjoining anchoring portion to be expanded in sectors by the frustoconical head portion of the tension bolt when the tension bolt is screwed into the female-threaded portion of the expanding sleeve. The polygonal cross section of the expanding sleeve has sides with middle regions and axially parallel predetermined breaking lines each being formed in the middle region of a respective one of the sides for dividing the sides into partial lateral surfaces. Each two of the partial lateral surfaces extend outwardly from a respective one of the predetermined breaking lines and rise toward one another at an obtuse angle.

18 Claims, 2 Drawing Sheets

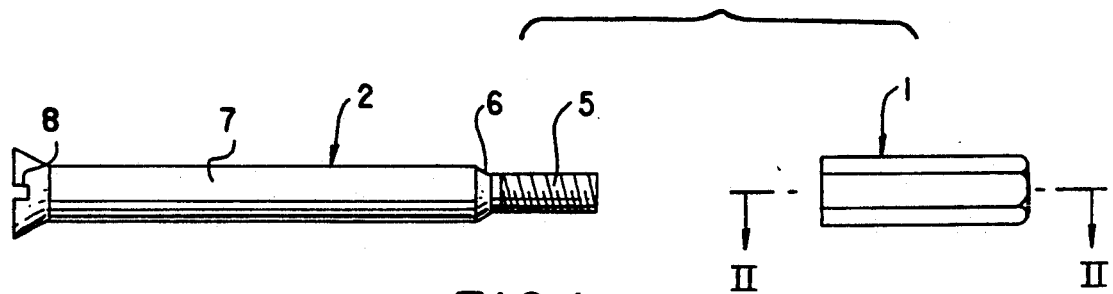
FIG.1
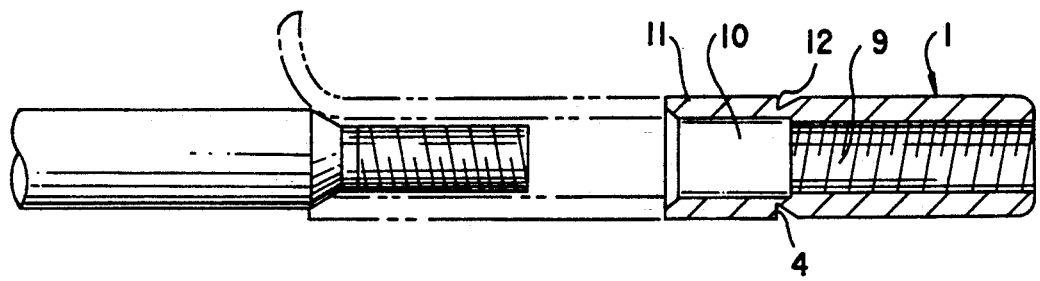
FIG.2
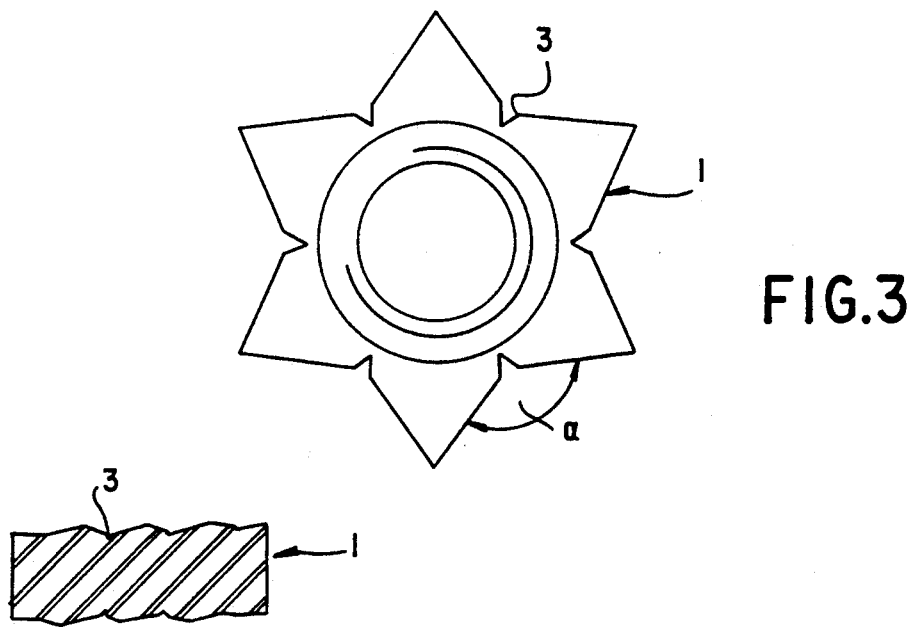
FIG.3
FIG.1a

ANCHOR BOLT

BACKGROUND OF THE INVENTION

1. Field of the Invention

The invention relates to an anchor bolt for anchoring in a hole of an arbitrary component, including a tension bolt having a threaded portion and an adjoining frustoconical head portion, and an expanding sleeve having a polygonal cross section, a female-threaded portion and an adjoining anchoring portion to be expanded in sectors by the frustoconical head portion of the tension bolt when the tension bolt is screwed into the female-threaded portion of the expanding sleeve, and an axially parallel predetermined breaking line disposed in a middle region of each side of the polygon.

2. Description of the Related Art

An anchor bolt of the generic described is known from European Patent No. 0 008 085, corresponding to U.S. Pat. No. 4,408,937. The polygonal cross section of the expanding sleeve in that device prevents the expanding sleeve from being made to rotate in the hole as the tension bolt is being tightened. Existing sharp edges of the expanding sleeve facilitate penetration into the material of the wall around the hole and thus the anchoring of the expanding sleeve in the hole.

It is accordingly an object of the invention to provide an anchor bolt, which overcomes the hereinafore-mentioned disadvantages of the heretofore-known devices of this general type and which improves the anchoring of the expanding sleeve in the hole, so that greater forces can be withstood even when used for thin components.

SUMMARY OF THE INVENTION

With the foregoing and other objects in view there is provided, in accordance with the invention, an anchor bolt for anchoring in a hole of an arbitrary component, comprising a tension bolt having a threaded portion and an adjoining frustoconical head portion; and an expanding sleeve with a polygonal cross section, a female-threaded portion and an adjoining anchoring portion to be expanded in sectors by the frustoconical head portion of the tension bolt when the tension bolt is screwed into the female-threaded portion of the expanding sleeve, the polygonal cross section of the expanding sleeve having sides with middle regions and axially parallel predetermined breaking lines each being formed in the middle region of a respective one of the sides for dividing the sides into partial lateral surfaces being separated from one another by the predetermined breaking line, each two of the partial lateral surfaces extending outwardly from a respective one of the predetermined breaking lines and rising toward one another at an obtuse angle.

In accordance with another feature of the invention, the outer surface of the expanding sleeve is drawn helically.

In accordance with a further feature of the invent at least one annularly extending predetermined bending line is disposed on the periphery of the expanding sleeve and the predetermined bending line is preferably of triangular cross section.

In accordance with an added feature of the invention, the predetermined bending line has a cathetus extending at right angles to the jacket surface of the expanding sleeve and being disposed on a side of the predetermined bending line pointing toward a free head end of the anchoring portion.

In accordance with an additional feature of the invention, the threaded portion of the tension bolt is a male thread with a given diameter, and the outwardly-bendable anchoring portion has a free end with an inside diameter being no greater than the given diameter.

In accordance with yet another feature of the invention, the expanding sleeve and the tension bolt are associated with an outer sleeve having a holding disk, and the outer sleeve and the holding disk are produced in one piece or are subsequently joined into a unit.

In accordance with yet a further feature of the invention, the outer sleeve is extended beyond the holding disk with an overhanging part and is formed of a deformable material.

In accordance with yet an added feature of the invention, the expanding sleeve has maximally spreadable triangular segments with a given size, and the holding disk has a diameter or a shortest outer surface being at least the given size.

In accordance with yet an additional feature of the invention, the overhanging part of the outer sleeve has at least one radially encompassing predetermined severing line formed therein.

In accordance with a concomitant feature of the invention, the holding disk has additional profiled portions for engagement of a locking tool to protect against twisting or torsion.

The anchor bolt according to the invention is maximally well-suited for withstanding heavy loads, especially in soft materials such as aerated concrete. By providing at least one annular predetermined bending line over the periphery of the expanding sleeve, a virtually right-angled bending open of the triangular segments takes place. It also becomes possible to firmly connect an anchor bolt even with relatively thin components, such as metal sheets with trapezoidal corrugations. Due to the holding disk resting on the outside of the component, a counterpressure to the spread-apart triangular segments of the expanding sleeve, which rest on the inside of the component, is attained. By embedding the expanding sleeve and the tension bolt in the outer sleeve, which is still in existence even after the triangular segments have spread open, insulation against external factors is attained.

Other features which are considered as characteristic for the invention are set forth in the appended claims.

Although the invention is illustrated and described herein a embodied in an anchor bolt, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, exploded, front-elevational view of an expanding sleeve and a tension bolt before assembly;

FIG. 1a is a front-elevational view of an alternative embodiment of the expanding sleeve;

FIG. 2 is a fragmentary, sectional view taken along the line II—II of FIG. 1, in the direction of the arrows;

FIG. 3 is an enlarged end view of an expanding sleeve;

DESCRIPTION OF THE PREFERRED EMBODIMENT

Figure 4:
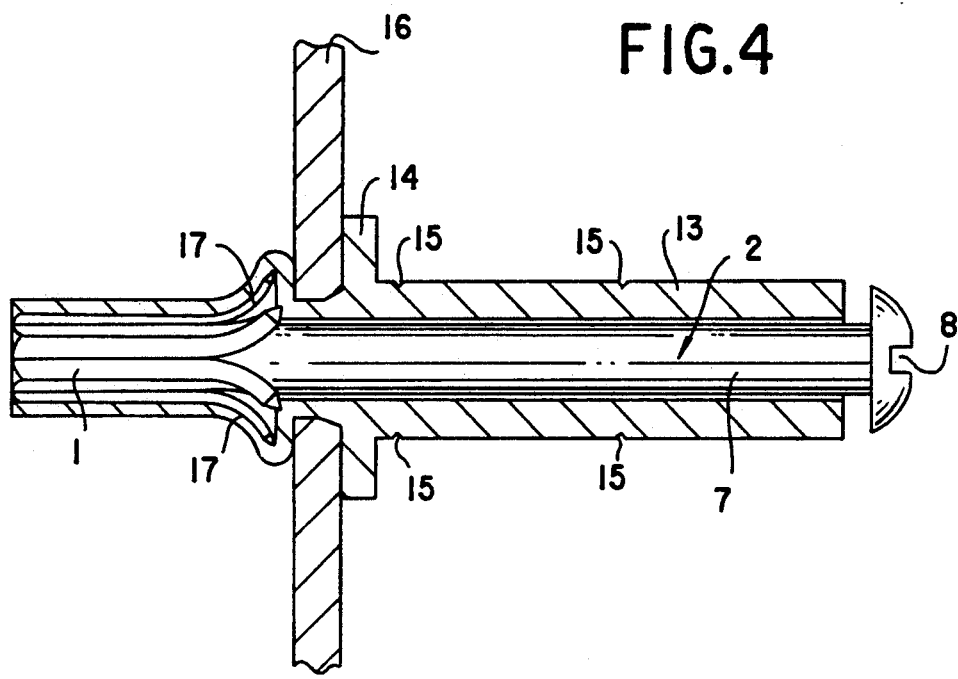
FIG. 4 is a longitudinal-sectional view of an anchor bolt supported in a metal sheet with trapezoidal corrugations.
Figure 5:
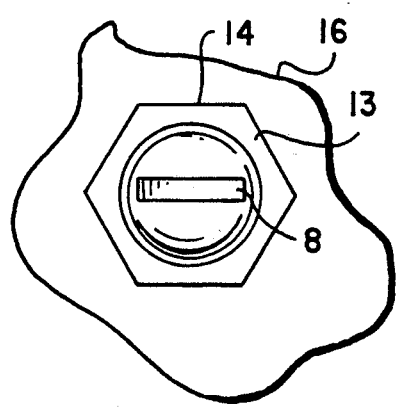
FIG. 5 is a top-plan view of the configuration shown in FIG. 4.

Referring now to the figures of the drawing in detail and first, particularly, to FIG. 1 thereof, there is seen a tension bolt 2 which is provided with a male thread 5 in a known manner that is adjoined by a frustoconical head portion 6. The head portion 6 changes into a cylindrical shaft 7, which may vary in length depending on the intended use. In order to turn the tension bolt 2, its end surface is provided with a corresponding profiled portion 8.

An expanding sleeve 1 has a polygonal cross section in the shape of a hexagon. As is seen in FIG. 2, a female thread 9 in an axial hole 10 in the expanding sleeve 1 serves to receive the male thread 5 of the tension bolt 2. The female thread 9 is adjoined by a anchoring portion 11 that can be spread in sectors.

The end view of the expanding sleeve 1 of FIG. 3 shows that an axially parallel predetermined breaking line 3 is disposed in a middle region of each side of the expanding sleeve 1. Beginning at this predetermined breaking line 3, adjoining partial lateral surfaces rise outwardly relative to one another by an obtuse angle $\alpha$. An encompassing annular predetermined bending line 4 is provided over the periphery of the expanding sleeve 1. The predetermined bending line 4 has a triangular cross section, with a cathetus 12 extending at right angles to the jacket surface of the expanding sleeve 1.

As is shown in broken lines in FIG. 2, major outward bending of the anchoring portion 11 and thus an improved combination action in the hole 10 is attained if the inside diameter at the free end of the outward-bendable anchoring portion 11 of the expanding sleeve 1 is equal to or less than the diameter of the male thread 5 of the tension bolt 2. The surface of the expanding sleeve 1 is provided with profiled portions of arbitrary shape, which increases the coefficient of friction between the outer wall of the expanding sleeve 1 and the inner wall at the hole 10.

In FIG. 4, the male thread 5 of the tension bolt 2 has been screwed into the female thread 9 of the expanding sleeve 1, so that triangular segments 17 of the expanding sleeve 1 spread open and press against an inner surface of a fixedly installed component in the form of a metal sheet 16 with trapezoidal corrugations. The expanding sleeve 1 and the tension bolt 2 are supported in an outer sleeve 13 that is provided with a holding disk 14. The outer sleeve 13 and the holding disk 14 are produced in one piece from a deformable material, such as plastic. The holding disk 14 may be round or polygonal in shape, and the diameter or the shortest outer surface of the holding disk 14, depending on whether a round or polygonal shape is used, is at least the size of the maximally spreadable triangular segments 17 of the expanding sleeve 1 in order to produce the anchoring. FIG. 4 shows the holding disk 14 being joined in one piece to the outer sleeve 13. The holding disk 14 extends beyond the outer boundary of the spread-open triangular segments 17 and as a result it provides an adequate counterpressure when the tension bolt 2 is tightened and the triangular segments 17 accordingly spread apart. Once the spreading process has ended, the spread-apart triangular segments 17 rest firmly against the sheet 16 with the trapezoidal configurations, which is reinforced at this point by the holding disk 14. As a result of the holding disk 1, a counterpressure to the pressure of the triangular segments 17 is exerted, thereby averting deformation of the sheet 16 with the trapezoidal corrugations and attaining an adequate friction lock for withstanding the intended load.

The outer sleeve 13 is extended beyond the holding disk 14. This extended part, which projects in overhanging fashion from the sheet 16 in the installed state, has a plurality of radially encompassing predetermined severing lines 15, which are formed by notches or cuts. As a result, the outer sleeve 13 can rapidly be cut to length as required. The holding disk 14 is provided for allowing the engagement of a locking tool with additional profiled portions. This makes it possible to avoid twisting of the outer sleeve 13 as the tension bolt 2 is tightened.

As is shown in FIG. 4, the wall of the outer sleeve 13, which is formed of deformable material, is constructed with a greater thickness, beginning at the holding disk 14 and extending as far as the end surface of the projecting part. The thinner part of the wall of the outer sleeve 13, which extends in the region of the expanding sleeve 1, is stretched as a result of the spreading of the triangular segments 17. As a result, an insulation from external factors which is provided by the continuous outer sleeve 13, is preserved even in the region where spreading occurs. This continuous insulation, which is important for the installed state, is attainable even if the wall of the outer sleeve 13 is not weakened. In that case, however, an additional exertion of force is then necessary in order to spread apart the wall of the outer sleeve 13. An inner recess of the outer sleeve 13 is adapted to the external shape of the expanding sleeve 1. The outer sleeve 13 can not only be shortened but it can also be lengthened, by means of lengthening pieces that can be attached in a form-locking and torsion-proof manner. A form-locking connection is one which connects two elements together due to the shape of the elements themselves, as opposed to a force-locking connection, which locks the elements together by force external to the elements.

In order to assemble the anchor bolt, the threaded portion of the tension bolt 2 is first screwed lightly into the expanding sleeve 1, and the two are inserted into the outer sleeve 13. The unit which is thus prepared is then inserted into the hole in the sheet 16 with the trapezoidal corrugations, far enough to enable the holding disk 14 to rest flat on the outer surface of the sheet 16. Subsequently, the holding disk 14 is secured against torsion by means of a suitable tool, and the tension bolt 2, which has the corresponding profiled portion 8 at its head, is tightened until the spread-apart triangular segments 17 rest with adequate friction locking on the inside of the sheet 16. The length of the cylindrical shaft 7 of the tension bolt 2 and the length of the projecting part of the outer sleeve 13 are adapted to one another. The cylindrical shaft 7 serves together with the projecting part of the outer sleeve 13, as a spacer for securing articles, such as tubes, that must extend at a distance from the sheet 16 with the trapezoidal corrugations.

We claim:

1. An anchor bolt for anchoring in a hole of an arbitrary component, comprising:
   a tension bolt having a threaded portion and an adjoining frustoconical head portion; and
   an expanding sleeve with a polygonal cross section, a female-threaded portion and an adjoining anchoring portion to be expanded in sectors by said frustoconical head portion of said tension bolt when said tension bolt is screwed into said female-threaded portion of said expanding sleeve,
   said polygonal cross section of said expanding sleeve having sides with middle regions and axially parallel predetermined breaking lines each being formed in said middle region of a respective one of said sides for dividing said sides into partial lateral surfaces, each two of said partial lateral surfaces extending outwardly from a respective one of said predetermined breaking lines and rising toward one another at an obtuse angle.

2. The anchor bolt according to claim 1, wherein said expanding sleeve has an outer surface with a helically drawn surface profile.

3. The anchor bolt according to claim 1, wherein said expanding sleeve has a periphery and at least one annularly extending predetermined bending line in the form of a groove formed therein over the periphery of said expanding sleeve.

4. The anchor bolt according to claim 3, wherein said predetermined bending line has a triangular cross section.

5. The anchor bolt according to claim 4, wherein said expanding sleeve has an outer surface, said anchoring portion has a free head end, and said predetermined bending line has a cathetus extended at right angles to said jacket surface and being disposed on a side of said predetermined bending line pointing toward said free head end of said anchoring portion.

6. The anchor bolt according to claim 1, wherein said threaded portion of said tension bolt is a male thread with a given diameter, and said outwardly-bendable anchoring portion has a free end with an inside diameter being no greater than said given diameter.

7. The anchor bolt according to claim 1, including an outer sleeve with a holding disk adapted to receive said tension bolt, said outer sleeve and said holding disk being a one-piece unit.

8. The anchor bolt according to claim 7, wherein said outer sleeve is extended beyond said holding disk with an overhanging part and is formed of a deformable material.

9. The anchor bolt according to claim 8, wherein said overhanging part of said outer sleeve has at least one circumferentially encompassing predetermined severing line formed therein.

10. The anchor bolt according to claim 7, wherein said expanding sleeve has triangular segments which are maximally spreadable to a given size, and said holding disk has a diameter being at least said given size.

11. The anchor bolt according to claim 7, wherein said expanding sleeve has triangular segments which are maximally spreadable to a given size, and said holding disk has a shortest outer surface being at least said given size.

12. The anchor bolt according to claim 7, wherein said holding disk includes means for engagement of a locking tool to protect against twisting.

13. The anchor bolt according to claim 1, including an outer sleeve with a holding disk adapted to receive said tension bolt, said outer sleeve and said holding disk being joined into a unit.

14. The anchor bolt according to claim 13, wherein said expanding sleeve has triangular segments which are maximally spreadable to a given size, and said holding disk has a diameter being at least said given size.

15. The anchor bolt according to claim 8, wherein said expanding sleeve has triangular segments which are maximally spreadable to a given size, and said holding disk has a shortest outer surface being at least said given size.

16. The anchor bolt according to claim 8, wherein said holding disk includes means for engagement of a locking tool to protect against twisting.

17. The anchor bolt according to claim 8, wherein said outer sleeve is extended beyond said holding disk with an overhanging part and is formed of a deformable material.

18. The anchor bolt according to claim 17, wherein said overhanging part of said outer sleeve has at least one circumferentially encompassing predetermined severing line formed therein.

* * * * *